(12) United States Patent
Kanjavalappil Raveendranath et al.

(10) Patent No.: US 10,291,118 B2
(45) Date of Patent: May 14, 2019

(54) POWER CONVERTER CONTROLLER

(71) Applicant: TEXAS INSTRUMENTS INCORPORATED, Dallas, TX (US)

(72) Inventors: Rejin Kanjavalappil Raveendranath, Thrissur (IN); Sudhir Polarouthu, Bengaluru (IN); Jasjot Singh Chadha, Bengaluru (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/847,383

(22) Filed: Dec. 19, 2017

(65) Prior Publication Data

US 2018/0175728 A1    Jun. 21, 2018

(30) Foreign Application Priority Data

Dec. 20, 2016   (IN) .............................. 201641043437

(51) Int. Cl.
*H02M 3/156* (2006.01)
*H02M 1/08* (2006.01)
*H02M 1/00* (2006.01)

(52) U.S. Cl.
CPC ............. *H02M 3/156* (2013.01); *H02M 1/08* (2013.01); *H02M 2001/0009* (2013.01); *H02M 2001/0048* (2013.01); *Y02B 70/1491* (2013.01)

(58) Field of Classification Search
CPC ................. H02M 3/156; H02M 1/08; H02M 2001/0009; H02M 2001/0048; H02M 3/155; H02M 3/158; H02M 2001/0025; H02M 1/32
See application file for complete search history.

(56) References Cited

U.S. PATENT DOCUMENTS

| | | | | |
|---|---|---|---|---|
| 5,463,333 A * | 10/1995 | Calder | ............... | H03K 3/02337 327/205 |
| 6,441,693 B1 * | 8/2002 | Lange | ...................... | H03K 7/08 331/143 |
| 6,501,236 B1 * | 12/2002 | Smith | .................. | H05B 39/047 315/224 |
| 7,812,569 B2 * | 10/2010 | Weber | .............. | G01R 19/16542 320/127 |
| 2004/0239296 A1 * | 12/2004 | Turchi | ...................... | G05F 1/70 323/222 |
| 2005/0206358 A1 * | 9/2005 | Van Der Horn | ...... | H02M 3/156 323/282 |
| 2007/0002944 A1 * | 1/2007 | Wiktor | ..................... | H03K 7/08 375/238 |
| 2007/0285031 A1 * | 12/2007 | Shteynberg | ........... | H02M 3/157 315/294 |

(Continued)

*Primary Examiner* — Gustavo A Rosario-Benitez
(74) *Attorney, Agent, or Firm* — Tuenlap Chan; Charles A. Brill; Frank D. Cimino

(57) ABSTRACT

A power supply, comprising a controller comprising a first switch coupled between a first node and a second node, a first resistor coupled between the second node and a third node, a second resistor coupled between the first node and a fourth node, a capacitor coupled between the fourth node and a fifth node, an amplifier coupled at a first input to the fourth node, at a second input to the third node, and at an output to the fifth node, and a comparator coupled at a first input to the fifth node and at a second input to the third node.

16 Claims, 6 Drawing Sheets

(56) References Cited

U.S. PATENT DOCUMENTS

| | | | |
|---|---|---|---|
| 2012/0194264 A1* | 8/2012 | Chamakura | G05F 3/262 327/538 |
| 2013/0307511 A1* | 11/2013 | De Vries | G01R 19/0092 323/284 |
| 2015/0137859 A1* | 5/2015 | Eum | H03K 17/16 327/109 |
| 2016/0141957 A1* | 5/2016 | Ozawa | G01R 19/00 323/271 |
| 2018/0248466 A1* | 8/2018 | Pham | H02M 1/08 |

* cited by examiner

POWER CONVERTER CONTROLLER

CROSS-REFERENCE TO RELATED APPLICATIONS

The present application claims priority to Indian Provisional Patent Application No. 201641043437, which was filed Dec. 20, 2016, is titled "Cycle to Cycle Average Input Current Limit for Hybrid Boost Topology," and is hereby incorporated herein by reference in its entirety.

SUMMARY

According to aspects of the disclosure, a power supply comprising a controller comprising a first switch coupled between a first node and a second node, a first resistor coupled between the second node and a third node, a second resistor coupled between the first node and a fourth node, a capacitor coupled between the fourth node and a fifth node, an amplifier coupled at a first input to the fourth node, at a second input to the third node, and at an output to the fifth node, and a comparator coupled at a first input to the fifth node and at a second input to the third node.

In other aspects of the disclosure, a controller configured to receive a reference current at a first node, divide the reference current to form a divided reference current by controlling a switch based on a phase of operation of a power converter, wherein the switch is coupled between the first node and a second node, and wherein a first resistor is coupled between the second node and a third node, and subtract a sensed current from the divided reference current to form a difference current, wherein the sensed current is provided to the current limiter at a fourth node by a sense element, and wherein a second resistor is coupled between the first node and the fourth node. The controller may also integrate the difference current using an integrator, wherein the integrator is coupled at a first input to the fourth node, at a second input to the third node, and at an output to a fifth node and compare the difference current to a bias voltage using a comparator, wherein the comparator is coupled at a first input to the fifth node and at a second input to the third node, and wherein the bias voltage is provided to the current limiter at the third node.

In other aspects of the disclosure, a method comprising receiving a reference current, controlling at least a first switch to divide the reference current; subtracting a sensed current from the divided current to form a difference current, integrating the difference current to form an integration result, comparing the integration result to a bias voltage, and controlling operation of a power converter based on a result of the comparison.

BRIEF DESCRIPTION OF THE DRAWINGS

For a detailed description of various examples, reference will now be made to the accompanying drawings in which.

DETAILED DESCRIPTION

Power converters are electrical components that convert an input voltage to an output voltage that is less than the input voltage (in the case of a buck converter) or greater than the input voltage (in the case of a boost converter). Some converters can produce an output voltage that is either less than or greater than the input voltage (in the case of a buck-boost converter). Power converters produce the output voltage through a series of switching actions that charge and discharge energy storage elements, such as inductors and/or capacitors.

In some devices implementing a power converter, it may be desirable to limit a maximum amount of current that may be provided to the power converter. For example, in mobile devices in which a battery capable of providing a finite amount of current is in use, it may be desirable to limit the current flowing into the power converter to maximize a usable life of the battery before recharging the battery. Some current limiters may limit a peak current provided to a power converter. However, peak current limiting may inhibit certain operations that may benefit from momentarily increased amounts of current that could trigger the current limiting. For example, a momentary pulse of current to illuminate one or more light-emitting diodes corresponding to the mobile device taking a photograph may have a peak. Thus, a peak current may not be representative of a normal amount of input current of a power converter and setting a current limit too low may inhibit the operations that may benefit from the momentarily increased amount of current. Some current limiters may also limit average current provided to a power converter. Some of these current limiters may use multiple current sensing elements, thereby increasing a size and cost of the current limiting architecture, as well as consuming more current from the battery in performing the current limiting operations.

At least some aspects of the present disclosure provide for a current limiting architecture for limiting input current to a power converter. In at least one example, the current limiting architecture includes a single current sense element for sensing the current of the power converter. In at least one example, the current limiting architecture limits a cycle-to-cycle input current of the power converter, thereby at least partially mitigating the peak current limiting approach discussed above. The power converter may be any suitable type of power converter, the scope of which is not limited herein. In at least one embodiment, the power converter is a hybrid boost converter. In at least one example, the current limiting architecture continuously (or substantially continuously) integrates current through a capacitor. In this example, the current integration may at least partially cause an accuracy of the current limiting architecture to be independent of delay or offset of a comparator of the current limiting architecture.

Figure 1:
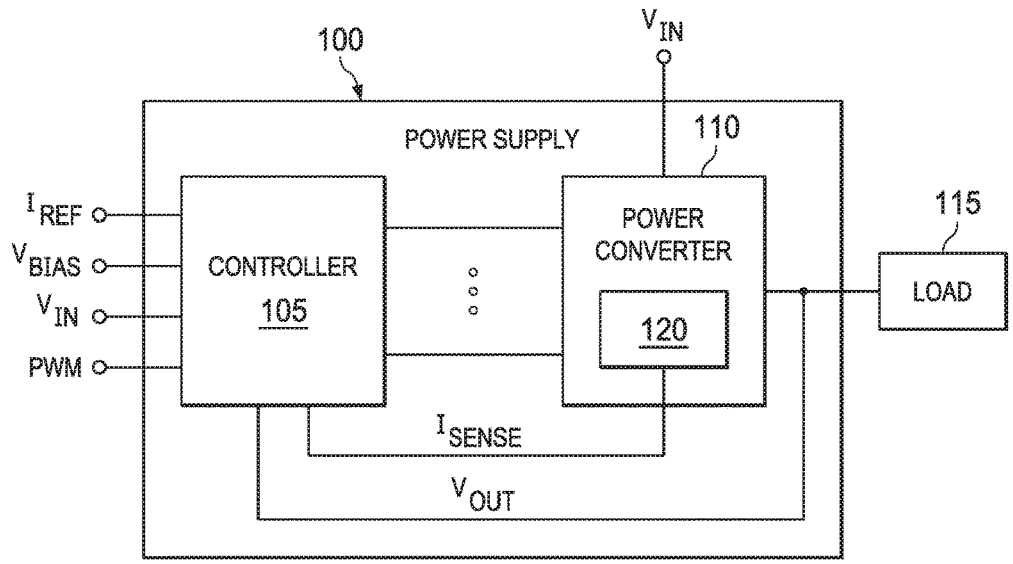
FIG. 1 is a schematic diagram of an illustrative power supply.

Referring now to FIG. 1, a schematic diagram of an illustrative power supply 100 is shown. In at least one example, the power supply 100 includes a controller 105 and a power converter 110. In at least one example, the power supply 100 is a switched mode power supply (SMPS). The power supply 100 transfers power from an input power source ($V_{IN}$) to a load 115 by switching (e.g., via one or more control signals generated and/or transmitted by the controller 105) one or more elements (e.g., power transistors) of the power converter 110 that is coupled, or configured to couple, to the load 115. In at least one example, the controller 105 generates and/or transmits control signals to the one or more elements (e.g., gate control signals to one or more of the power transistors) of the power converter 110. In some examples, the controller 105 and the power converter 110 are each implemented as standalone devices (e.g., each implemented on their own respective electrical die, enclosed within their own respective own chip package, etc.). In other examples, the controller 105 and/or the power converter 110 are implemented with other devices (e.g., on an electrical die including other devices, enclosed in a chip package that includes other devices, included with each other in a single chip package, etc.). In at least one example, the power converter 110 is configured to couple to one or more other components to provide power conversion/supply operations. Such components may include, for example, energy storage capacitors and/or inductors, as will be discussed in greater detail below. In another example, the other components may be implemented along with the power converter 110, for example, on a same die, in a common (e.g., shared) chip package, etc.

In some example architectures (such as buck, boost, and/or buck-boost), the power supply 100 may include, in addition to any energy storage element(s), an output/bulk capacitor (not shown) configured to couple in parallel to the load 115. In at least one example, the controller 105 controls the power transistor(s) of the power converter 110 to form circuit arrangements (at a transistor node) with the energy storage element(s) to supply load current to the load, as well as to the output/bulk capacitor to enable the output/bulk capacitor to maintain a regulated output voltage (e.g., such as by filtering the switched load current). For example, the controller 105 can be coupled through the transistor node to an energy storage inductor, which is switched between charge and discharge cycles, based on a pulse width modulated (PWM) duty cycle, to supply inductor current (e.g., current through the energy storage inductor) to the load, and to the output/bulk capacitor to filter the switched inductor current to maintain the regulated output voltage.

In at least one example, the controller 105 monitors feedback ($I_{SENSE}$) received from the power converter 110 to determine an input current of the power converter 110. In some examples, the controller 105 may receive additional feedback from the power converter 110 (e.g., such as an output voltage ($V_{OUT}$) of the power converter 110 and may base other aspects of control of the power converter 110 on such additional feedback, details of which are not included herein. The controller 105 receives the feedback, for example, from a sense element 120 of the power converter 110. The sense element 120 may be a sense resistor, a power transistor of the power converter 110, a current mirror, a current sense amplifier, a transistor that is a scaled replica of a power transistor of the power converter 110, or may be any other suitable element for sensing a current flowing into the power converter 110. For example, the controller 105 may monitor the input current of the power converter 110 and control the power converter 110 at least partially based on that monitoring. In at least one example, the controller 105 controls the power converter 110 to operate (e.g., controls the power transistors of the power converter 110 to switch on or off) when a current draw of the power converter 110 (e.g., the input current of the power converter 110) does not exceed a predefined reference or threshold ($I_{REF}$). Similarly, in at least one example, the controller 105 controls the power converter 110 not to operate (e.g., controls the power transistors of the power converter 110 not to switch on or off) when the current draw of the power converter 110 exceeds the predefined reference or threshold. In this way, the controller 105 limits a current draw of the power converter 110 to $I_{REF}$.

Figure 2:
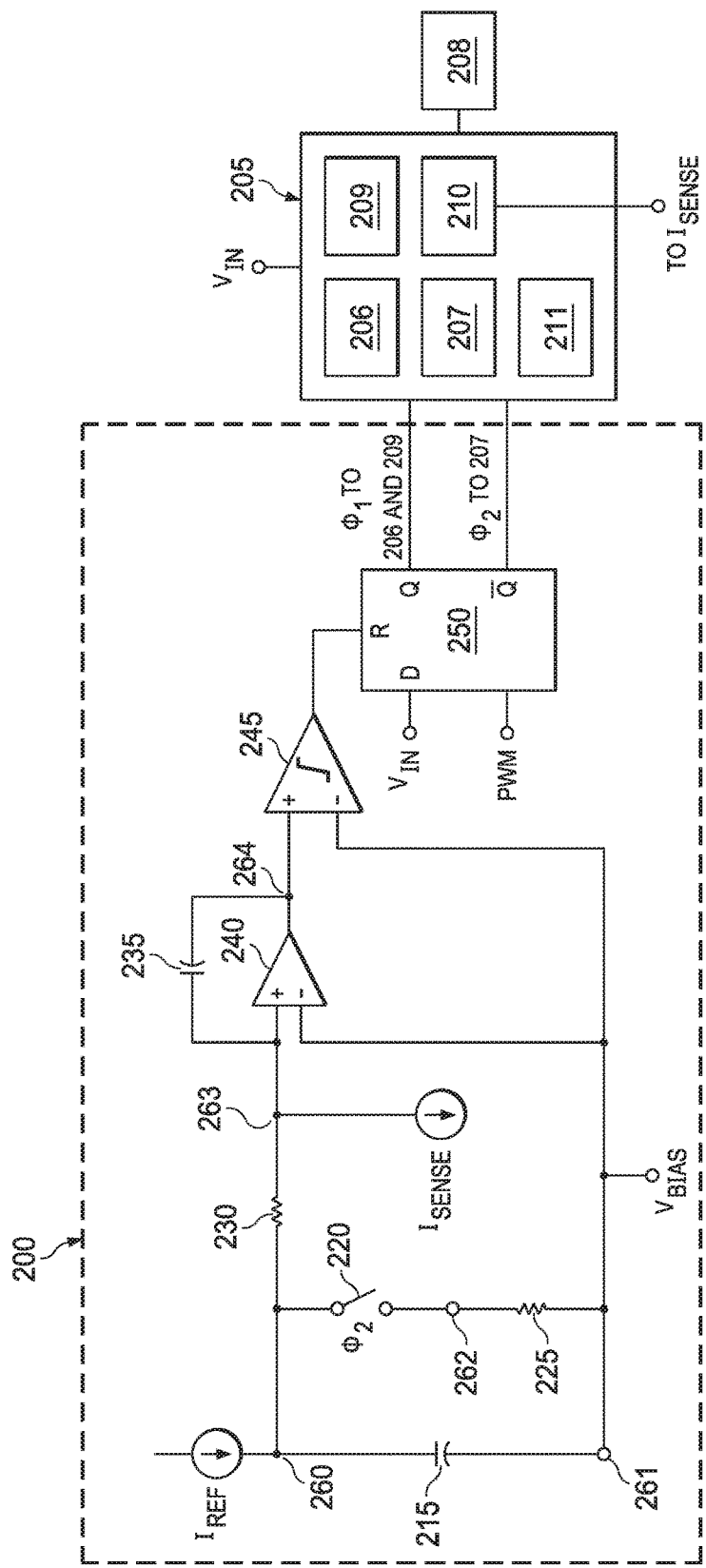
FIG. 2 is a schematic diagram of an illustrative controller.

Referring now to FIG. 2, a schematic diagram of an illustrative controller 200 is shown. In at least one example, the controller 200 is suitable for implementation as the controller 105, discussed above with reference to FIG. 1. In at least some examples, the controller 200 may be referred to as a current limiter or a power converter current limiter. For example, the controller 200 may limit an average input current of a power converter 205 (which may be substantially similar to the power converter 110 and may include a sense element 210, which may be substantially similar to the sense element 120, each of which is discussed above with reference to FIG. 1 and details for which are not repeated herein) by monitoring the input current of the power converter 205. In at least one example, the power converter 205 is a hybrid boost converter having at least a first transistor 206 associated with a first phase of operation (e.g., in which the power converter 205 draws current from a power source coupled to the power converter 205 to provide to a load 208) and at least a second transistor 207 associated with a second phase of operation (e.g., in which the power converter 205 does not draw current from the power converter to provide to the load 208). In at least one example, the sense element 210 may provide the controller 200 with a feedback signal representative of a current flowing through the first transistor 206. In at least one example, the power converter 205 may further include a third transistor 209 and a second sense element 211 that may provide the controller 200 with a second feedback signal representative of a current flowing through the third transistor 209. In at least one example, the third transistor 209 may couple between a fly capacitor (not shown) of the power converter 205 and $V_{IN}$ (e.g., when the power converter 200 is a hybrid buck-boost converter).

In at least one example, the controller 200 includes a capacitor 215, a switch 220, a resistor 225, a resistor 230, a capacitor 235, an amplifier 240, and a comparator 245. The capacitor 235 and the amplifier 240 may, in some examples, be referred to as an integrator. In various examples, the controller 200 further includes, or is configured to couple to, a latch 250. In at least one example, the latch 250 is coupled, or configured to couple, to the power converter 205. In another example, the comparator 245 is configured to couple to the power converter 205. In at least one example, the controller 200 receives the reference $I_{REF}$ at a node 260. The controller 200 receives $I_{REF}$, for example, from an external component coupled to the controller 200 at node 260 or an internal circuit (not shown) coupled to node 260 and configured to generate $I_{REF}$ based on any suitable criteria, the scope of which is not limited herein. In at least one example, the controller 200 also receives a bias voltage ($V_{BIAS}$) at node 261. The controller 200 receives $V_{BIAS}$, for example, from an external component coupled to the controller 200 at node 261 or an internal circuit (not shown) coupled to node 261 and configured to generate $V_{BIAS}$ based on any suitable criteria, the scope of which is not limited herein.

In at least one example, the capacitor 215 is coupled between the node 260 and the node 261, the switch 220 is coupled between the node 260 and a node 262, the resistor 225 is coupled between the node 262 and the node 261, and the resistor 230 is coupled between the node 260 and a node 263. In at least one example, the controller 200 couples (or is configured to couple) to the converter 205 to receive the feedback (e.g., $I_{REF}$) at node 263. For example, the controller 200 may be configured to couple to the sense element 210 at node 263 such that an amount of current of the sense element 210 is subtracted (e.g., sunk from) from an amount of current present at node 263. In at least one example, the capacitor 235 is coupled between the node 263 and a node 264, the amplifier 240 is coupled at a first input to the node 263, and the amplifier 240 is coupled at a second input to the node 261. In at least one example, the amplifier 240 is coupled at an output to the node 264, a comparator 245 is coupled at a first input to the node 264, and the comparator 245 is coupled at a second input to the node 261. In at least one example, an output of the comparator 245 is coupled to the latch 250, for example, at a reset input of the latch 250. In another example, the output of the comparator 245 is coupled to the converter 205.

In at least one example, the controller 200 is configured to operate to limit input current of the power converter 205. To limit the input current, the controller 200 receives $I_{REF}$ and $I_{SENSE}$ and controls the power converter 205 to transition from operating in the first phase of operation to operating in the second phase of operation based on $I_{REF}$ and $I_{SENSE}$. For example, assuming average current through a fly capacitor (not shown) of the power converter 205 is zero, the input current ($I_{IN}$) of the power converter 205 may be approximated as:

$$(2-D)*I_{SENSE}, \quad (1)$$

where D is a duty cycle of the first transistor 206. When $I_{IN}$ exceeds $I_{REF}$, in at least one example, the controller 200 causes the power converter 205 to transition from operating in the first phase of operation to operating in the second phase of operation.

In various examples, the switch 220 may be any suitable switch capable of being controlled to open and close (e.g., conduct between two respective terminals). In at least one example, the switch 220 is a metal oxide semiconductor field effect transistor (MOSFET). In at least one example, the switch 220 is configured to operate at least partially based on a control signal provided by the controller 200 to the power converter 205 to control the second transistor 207. For example, when the second transistor 207 is controlled to turn on (e.g., conduct between two terminals, such as a drain and a source terminal, of the second transistor 207), the switch 220 is controlled to be closed and conduct between two terminals of the switch 220. Similarly, when the second transistor 207 is controlled to turn off (e.g., not conduct between two terminals, such as the drain and the source terminal, of the second transistor 207), the switch 220 is controlled to be open and not conduct between the two terminals of the switch 220. In at least one example, a duty cycle of the switch 220 is (1−D).

In at least one example, a value of resistance of the resistor 225 is approximately the same as a value of resistance of the resistor 230. While each are illustrated as single resistors, the resistor 225 and/or the resistor 230 may be implemented as any one or more electrical components having a predefined or adjustable amount of impedance. When the switch 220 closes, a portion of $I_{REF}$ flows through the resistor 225. A portion of $I_{REF}$ also flows through the resistor 230. A value of the portion of $I_{REF}$ that flows through the resistor 225 may be a square wave signal having a magnitude approximated by:

$$\frac{(1-D)}{(2-D)}*I_{REF}, \quad (2)$$

In at least one example, a value of the portion of $I_{REF}$ that flows from node 260 through the resistor 230 to node 263 may be a direct current (DC) signal having a magnitude approximated by:

$$\frac{I_{REF}}{(2-D)}. \quad (3)$$

In at least one example, the controller 200 sinks $I_{SENSE}$ from node 263 such that node 263 reflects a difference between the current as noted in equation 3 and $I_{SENSE}$. The controller 200 then integrates the resulting current present at node 263 across the capacitor 235. In at least one example, when $I_{SENSE}$ is greater than $I_{REF}$ (e.g., during the first phase of operation in which the first transistor 206 is conducting) an output of the amplifier 240 increases (e.g., substantially linearly). For example, as the capacitor 235 accumulates current (e.g., integrates the current present at node 263), a voltage of the capacitor 235 that is correspondingly present at node 263 and provided to the first input of the amplifier 240 increases. During the time period in which the voltage of the capacitor 235 increases, $V_{BIAS}$, which is provided to the second input of the amplifier 240, may remain approximately the same to cause an output of the amplifier 240 to increase approximately proportionally to the increase in the voltage of the capacitor 235. In at least one example, a value of capacitance of the capacitor 235 is not limited herein, but should be selected large enough that the capacitor 235 does not saturate during wither the first phase of operation or the second phase of operation. Additionally, in at least some examples the capacitor 215 provides an additional path for current to flow when the switch 220 is open such that an entire value of $I_{REF}$ does not flow solely through the resistor 230. In at least one example, a value of capacitance of the capacitor 215 is not limited herein.

In at least one example, the output of the amplifier 240 present at node 264 is provided to the first input of the comparator 245 and $V_{BIAS}$ is provided to the second input of the comparator 245. When the voltage present at the first input of the comparator 245 equals or exceeds $V_{BIAS}$, the comparator 245 outputs a logical high signal indicating that $I_{REF}$ has been reached. $V_{BIAS}$, in various examples, may be any fixed (e.g., constant) voltage potential suitable for use by the comparator 245, for example, such that a common mode input voltage of the comparator 245 may be optimized for performance based on the $V_{BIAS}$ selected, the scope of which is not limited herein. In at least some examples, a particular value chosen for $V_{BIAS}$ does not affect an outcome of the comparator 245 or the controller 200 (e.g., the value is considered an integration constant that does not affect the outcome). In at least some examples, the comparator 245 outputting the logical high signal controls the power converter 205 (either directly or indirectly through another component, such as the latch 250) to transition from operating in the first phase of operation to operating in the second phase of operation. The transition from the first phase of operation to the second phase of operation may limit input current of the power converter 205 such that current already stored in the power converter 205 flows out to the load 208 and additional current from the power source does not flow into the power converter 205.

The latch 250 is, in at least one example, a D flip-flop with asynchronous reset. In at least one example, the controller 200 controls the power converter 205 to transition from operating in the first phase of operation to operating in the second phase of operation by resetting the latch 250 to cause the latch 250 to control gate terminals of the first transistor 206 and, when present, the third transistor 209 (e.g. to turn off) and the second transistor 207 (e.g., to turn on) of the power converter 205. In at least one example, the latch 250 operates at a fixed frequency (e.g., as defined by a PWM signal, as discussed above). In this example, when the PWM signal next transitions from a low state to a high state, the latch 250 may control the gate terminals of the first transistor 206 and, when present, the third transistor 209 (e.g. to turn on) and the second transistor 207 (e.g., to turn off) of the power converter 205 to return to the first phase of operation from the second phase of operation.

While the power converter 205 is operating in the second phase of operation, in at least some examples, the first transistor 206 and, when present, the third transistor 209 are turned off and $I_{SENSE}$ is therefore approximately zero. During this time, $I_{SENSE}$ is less than $I_{REF}$ and the output of the amplifier 240 decreases (e.g., substantially linearly, such as with a slope of $I_{REF}$ divided by a capacitance value of capacitor 235) to lower away from the $V_{BIAS}$ threshold until the next first phase of operation of the power converter 205 in which the output of the amplifier 240 will again increase as discussed above.

Figure 3:
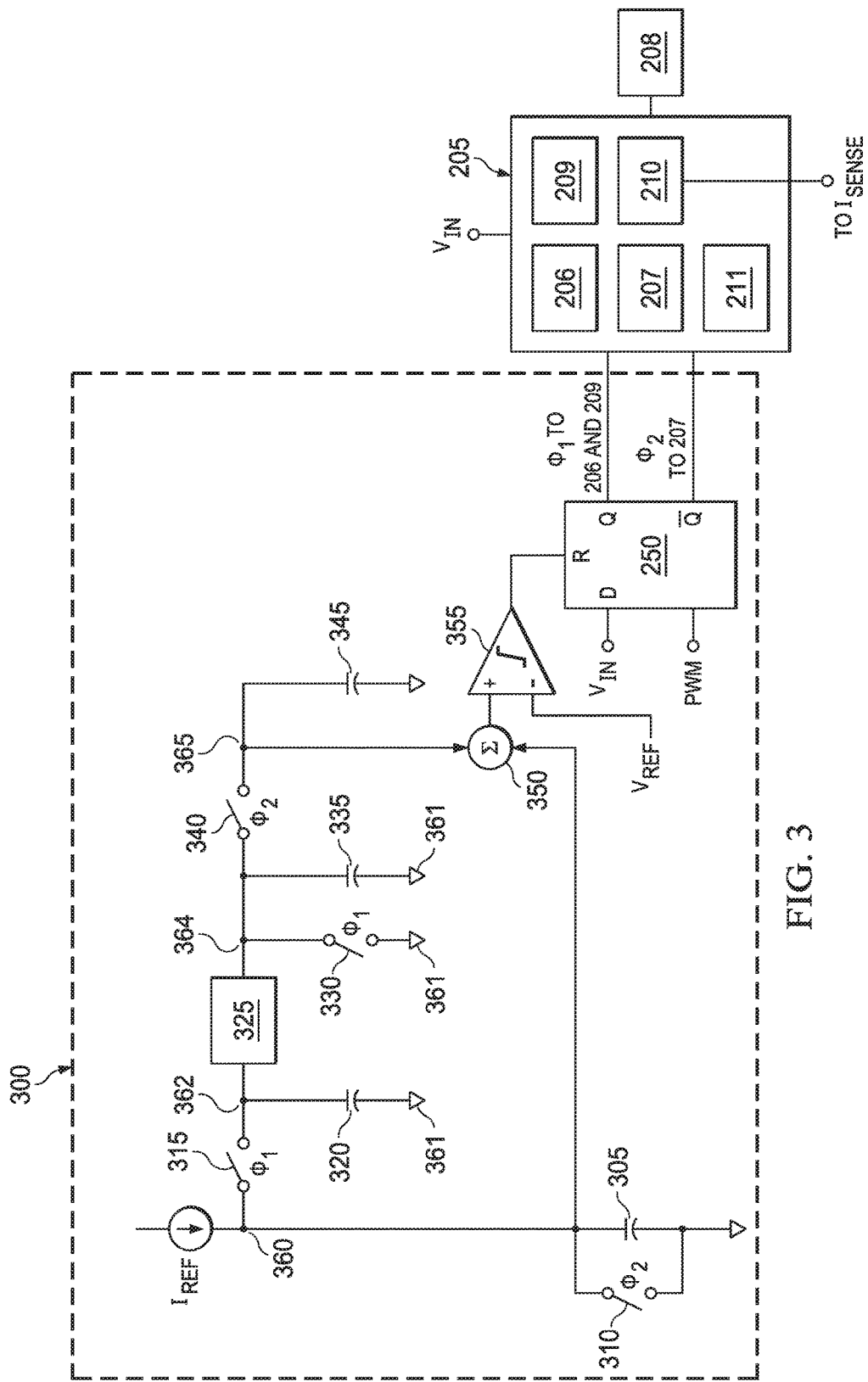
FIG. 3 is a schematic diagram of an illustrative controller.

Referring now to FIG. 3, a schematic diagram of an illustrative controller 300 is shown. In at least one example, the controller 300 is suitable for implementation as the controller 105, discussed above with reference to FIG. 1. In at least some examples, the controller 200 may be referred to as a current limiter or a power converter current limiter. For example, the controller 200 may limit an average input current of the power converter 205 (which may be as discussed above with reference to FIG. 2, details for which are not repeated herein) by monitoring the input current of the power converter 205. In at least one example, the sense element 210 may provide the controller 300 with a feedback signal representative of a current flowing through the first transistor 206.

In at least one example, the controller 300 includes a capacitor 305, a switch 310, a switch 315, a capacitor 320, a conversion circuit 325, a switch 330, a capacitor 335, a switch 340, a capacitor 345, a summation circuit 350, and a comparator 355. The capacitor 305 and the switch 310 may, in some examples, be referred to as an integrator. Additionally, the conversion circuit 325, the switch 330, and the capacitor 335 may, in some examples, also be referred to as an integrator. In various examples, the controller 300 further includes, or is configured to couple to, a latch 250 which may operate substantially as the latch 250, described above with reference to FIG. 2 and for which details are not repeated herein. In another example, the comparator 355 is configured to couple to the power converter 205.

In at least one example, the controller 300 receives the $I_{SENSE}$ at a node 360. The controller 300 receives $I_{SENSE}$, for example, from the sense element 210. In at least one example, the capacitor 305 is coupled between the node 360 and a ground voltage potential 361, the switch 310 is coupled between the node 360 and the ground voltage potential 361, the switch 315 is coupled between the node 360 and a node 362, and a second input of the summation circuit 350 is coupled to the node 360. In at least one example, the capacitor 320 is coupled between the node 362 and the ground voltage potential 361, the conversion circuit 325 is coupled between the node 362 and a node 364, the switch 330 is coupled between the node 364 and the ground voltage potential 361, the capacitor 335 is coupled between the node 364 and the ground voltage potential 361, and the switch 340 is coupled between the node 364 and a node 365. In at least one example, the capacitor 345 is coupled between the node 365 and the ground voltage potential 361, a first input of the summation circuit 350 is coupled to the node 365, an output of the summation circuit 350 is coupled to a first input of the comparator 355, and a second input of the comparator 355 is configured to receive $I_{REF}$. The comparator 355 receives $I_{REF}$, for example, from an external component coupled to the comparator 355 or an internal circuit (not shown) coupled to the comparator 355 and configured to generate $I_{REF}$ based on any suitable criteria, the scope of which is not limited herein.

In at least one example, the controller 300 is configured to operate to limit input current of the power converter 205. To limit the input current, the controller 300 receives $I_{REF}$ and $I_{SENSE}$ and controls the power converter 205 to transition from operating in the first phase of operation to operating in the second phase of operation based on $I_{REF}$ and $I_{SENSE}$. When $I_{IN}$ exceeds $I_{REF}$, in at least one example, the controller 300 causes the power converter 205 to transition from operating in the first phase of operation to operating in the second phase of operation.

In various examples, each of the switches 310, 315, 330, and 340 may be any suitable switch capable of being controlled to open and close (e.g., conduct between two respective terminals). In at least one example, at least some of the switches 310, 315, 330, and/or 340 are MOSFETs. In at least one example, the switches 310 and 340 are configured to operate at least partially based on a control signal provided by the controller 300 to the power converter 205 to control the second transistor 207. For example, when the second transistor 207 is controlled to turn on (e.g., conduct between two terminals, such as a drain and a source terminal, of the second transistor 207) the switches 310 and 340 are controlled to be closed and conduct between two terminals of the respective switch 310 or 340. Similarly, when the second transistor 207 is controlled to turn off (e.g., not conduct between two terminals, such as the drain and the source terminal, of the second transistor 207) the switches 310 and 340 are controlled to be open and not conduct between the two terminals of the respective switch 310 or 340. When the switch 310 is closed, the switch 310 may short node 360 to the ground voltage potential 361 such that approximately no current flows into the capacitor 305 and/or the capacitor 335 discharges. Similarly, in at least one example, the switches 315 and 330 are configured to operate at least partially based on a control signal provided by the controller 300 to the power converter 205 to control the first transistor 206 and, when present, the third transistor 209. For example, when the first transistor 206 and, when present, the third transistor 209 are controlled to turn on (e.g., conduct between two terminals, such as a drain and a source terminal, of the first transistor 206 and the third transistor 209, respectively) the switches 315 and 330 are controlled to be closed and conduct between two terminals of the respective switch 315 or 330. When the first transistor 206 and, when present, the third transistor 209 are controlled to turn off (e.g., not conduct between two terminals, such as the drain and the source terminal, of the first transistor 206 and the third transistor 209, respectively) the switches 315 and 330 are controlled to be open and not conduct between the two terminals of the respective switch 315 or 330. When the switch 330 is closed, the switch 330 may short node 364 to the ground voltage potential 361 such that approximately no current flows into the capacitor 335 and/or the capacitor 335 discharges.

In at least one example, when the switch 310 is open (e.g., during the first phase of operation of the power converter 205), the capacitor 305 integrates $I_{SENSE}$ (e.g., accumulates the $I_{SENSE}$ current) such that a voltage of the capacitor 305 (e.g., present at node 360) is representative of $I_{SENSE}$. During the first phase of operation of the power converter 205, in at least one example, the switch 315 is closed. When the switch is closed, node 362 is electrically coupled to node 360 and the capacitor 320 samples the voltage of the capacitor 305 (e.g., the voltage present at node 360, as discussed above). In at least one example, the conversion circuit 325 converts the voltage present at node 362 to a current. The conversion circuit 325 converts the voltage at node 362 to a current according to any suitable means, for example, a transconductance amplifier, an element having an amount of impedance, or according to any other suitable means or architecture.

During the first phase of operation of the power converter 205, in at least one example, the switch 330 is closed and the switch 340 is open. In this example, the switch 330 shorts node 364 to the ground voltage potential 361 such that approximately no current flows into the capacitor 335 and the open switch 340 prevents energy from flowing in the capacitor 345 or the first input of the summation circuit 350.

During the second phase of operation of the power converter 205, in at least one example, the switches 310 and 340 are closed and the switches 315 and 330 are open. In this example, the switch 310 shorts node 360 to ground, switch 315 opens to leave a voltage present at node 362 unchanging (e.g., by way of the voltage having no resistive elements across which to drop), the switch 330 is open to allow current to flow to the capacitor 335, and the switch 340 is closed to allow the capacitor 345 to sample the voltage of the capacitor 335 (e.g., substantially similar to the process with respect to capacitors 305 and 320, as discussed above).

In at least one example, when the switch 330 is open, the capacitor 335 integrates the output of the conversion circuit 325 such that a voltage of the capacitor 335 (e.g., present at node 364) is representative of the voltage present at node 362. In this way, as the power converter 205 alternates between the first phase of operation and the second phase of operation, a voltage of the capacitor 345 is representative of a current drawn by the immediately prior phase of operation and a voltage of the capacitor 305 is representative of a current drawn by the present phase of operation. In at least one example, the voltage of the capacitor 345 is provided to the first input of the summation circuit 350 such that a voltage present at the output of the summation circuit 350 is representative of a total current drawn by the power converter 205 during both phases of operation.

In at least one example, the output of the summation circuit 350 is provided to the first input of the comparator 355 and $V_{REF}$ is provided to the second input of the comparator 355. In at least one example, $V_{REF}$ is a voltage signal representative of $I_{REF}$. When the voltage present at the first input of the comparator 355 equals or exceeds $V_{REF}$, the comparator 355 outputs a logical high signal indicating that $I_{REF}$ (as represented by $V_{REF}$) has been reached. In at least some examples, the comparator 355 outputting the logical high signal controls the power converter 205 (either directly or indirectly through another component, such as the latch 250) to transition from operating in the first phase of operation to operating in the second phase of operation. The transition from the first phase of operation to the second phase of operation may limit input current of the power converter 205 such that current already stored in the power converter 205 flows out to the load 208 and additional current from the power source does not flow into the power converter 205.

In at least one example, the controller 300 controls the power converter 205 to transition from operating in the first phase of operation to operating in the second phase of operation by resetting the latch 250 to cause the latch 250 to control gate terminals of the first transistor 206 and, when present, the third transistor 209 (e.g., to turn off) and the second transistor 207 (e.g., to turn on) of the power converter 205. In at least one example, the latch 250 operates at a fixed frequency (e.g., as defined by a PWM signal, as discussed above). In this example, when the PWM signal next transitions from a low state to a high state, the latch 250 may control the gate terminals of the first transistor 206 and, when present, the third transistor 209 (e.g. to turn on) and the second transistor 207 (e.g., to turn off) of the power converter 205 to return to the first phase of operation from the second phase of operation.

Figure 4:
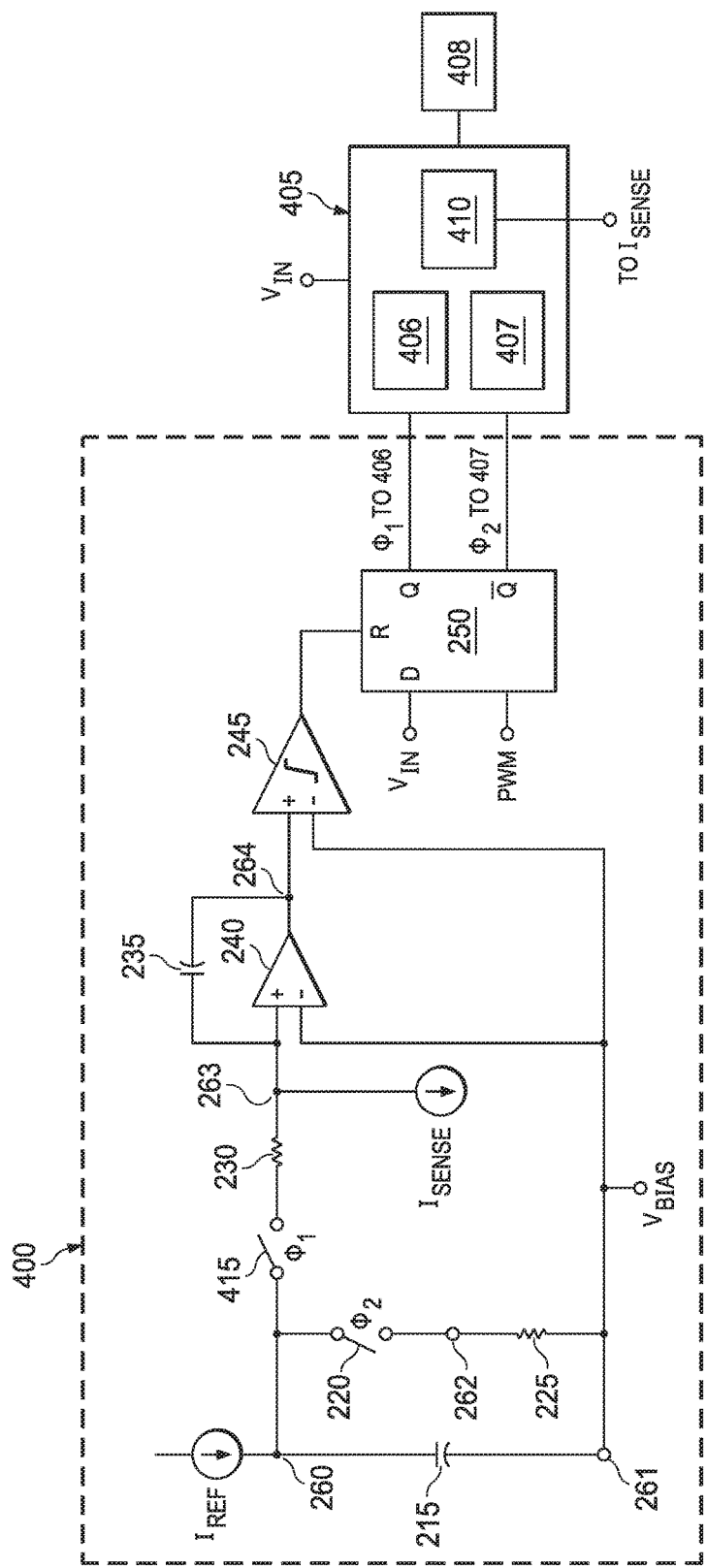
FIG. 4 is a schematic diagram of an illustrative controller.

Referring now to FIG. 4, a schematic diagram of an illustrative controller 400 is shown. In at least one example, the controller 400 is suitable for implementation as the controller 105, discussed above with reference to FIG. 1. In at least some examples, the controller 400 may be referred to as a current limiter or a power converter current limiter. For example, the controller 400 may limit an average input current of a power converter 405 (which may include a sense element 410 that may be substantially similar to the sense element 120, as discussed above with reference to FIG. 1 and details for which are not repeated herein) that provides power to a load 408 by monitoring the input current of the power converter 405. In at least one example, the power converter 405 is a non-hybrid boost converter having at least a first transistor 406 associated with a first phase of operation and at least a second transistor 407 associated with a second phase of operation. In at least one example, the sense element 410 may provide the controller 400 with a feedback signal representative of a current flowing through the first transistor 406. In at least one embodiment, components of the controller 400 may be substantially similar to components of the controller 200, details of which are not repeated herein.

For example, at least one implementation of the controller 400 may comprise the controller 200 with the addition of switch 415 positioned between node 360 and the resistor. In at least one example, the controller 400 is configured to operate to limit input current of the power converter 405. To limit the input current, the controller 400 receives $I_{REF}$ and $I_{SENSE}$ and controls the power converter 405 to transition from operating in the first phase of operation to operating in the second phase of operation based on $I_{REF}$ and $I_{SENSE}$. For example, the input current of the power converter 405 may be approximated as:

$$\beta * I_{SENSE}, \tag{4}$$

where $\beta$ is a duty cycle of the first transistor 406. When the input current of the power converter 405 exceeds $I_{REF}$, in at least one example, the controller 400 causes the power converter 405 to transition from operating in the first phase of operation to operating in the second phase of operation.

In various examples, the switch 415 may be any suitable switch capable of being controlled to open and close (e.g., conduct between two respective terminals). In at least one example, the switch 415 is a MOSFET. In at least one example, the switch 415 is configured to operate at least partially based on a control signal provided by the controller 400 to the power converter 405 to control the first transistor 406. For example, when the first transistor 406 is controlled to turn on (e.g., conduct between two terminals, such as a drain and a source terminal, of the first transistor 406) the switch 415 is controlled to be closed and conduct between two terminals of the switch 415. Similarly, when the first transistor 406 is controlled to turn off (e.g., not conduct between two terminals, such as the drain and the source terminal, of the first transistor 406) the switch 415 is controlled to be open and not conduct between the two terminals of the switch 415. In at least one example, a duty cycle of the switch 415 is 13.

In at least one example, when the switch 415 closes, a portion of $I_{REF}$ flows through the resistor 230. In at least one example, a value of the portion of $I_{REF}$ that flows from node 260 through the switch 415 and resistor 230 to node 263 when the switch 415 is closed may be a square wave signal having a magnitude approximated by:

$$\beta * I_{REF}. \quad (5)$$

A value of the portion of $I_{REF}$ that flows through the resistor 225 may be a square wave signal having a magnitude approximated by:

$$(1-\beta) * I_{REF}. \quad (6)$$

In at least one example, the controller 400 sinks $I_{SENSE}$ from node 263 such that node 263 reflects a difference between the current as noted in equation 5 and $I_{SENSE}$. The controller 400 then integrates the resulting current present at node 263 across the capacitor 235. In at least one example, the controller 400 further controls the power converter 405 based on the integration result of the capacitor 235 (e.g., the voltage present at node 263 and amplified to form the voltage present at node 264) in substantially the same manner as discussed above with respect to FIG. 2, the details of which are not repeated herein.

Figure 5:
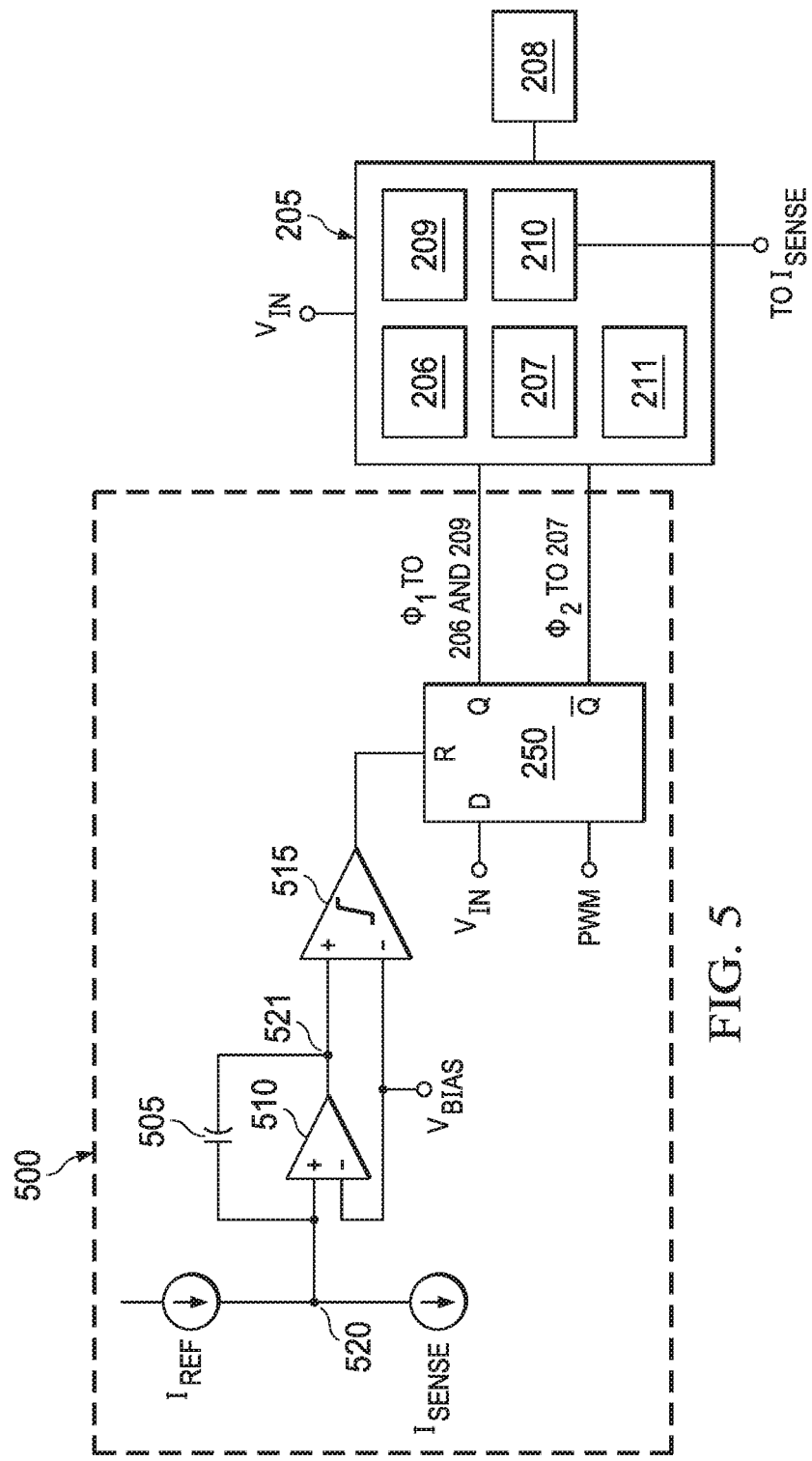
FIG. 5 is a schematic diagram of an illustrative controller.

Referring now to FIG. 5, a schematic diagram of an illustrative controller 500 is shown. In at least one example, the controller 500 is suitable for implementation as the controller 105, discussed above with reference to FIG. 1. In at least some examples, the controller 500 may be referred to as a current limiter (e.g., an inductor peak current limiter) or a power converter current limiter. For example, the controller 200 may limit an average input current of the power converter 205 (which may be as discussed above with reference to FIG. 2, details for which are not repeated herein) by monitoring the input current of the power converter 205. In at least one example, the power converter 205 is a hybrid boost converter having at least a first transistor 206 associated with a first phase of operation and at least a second transistor 207 associated with a second phase of operation. In at least one example, the sense element 210 may provide the controller 500 with a feedback signal representative of a current flowing through the first transistor 206.

In at least one example, the controller 500 includes a capacitor 505, an amplifier 510, and a comparator 515. The capacitor 505 and the amplifier 510 may, in some examples, be referred to as an integrator. In at least one example, the controller 500 receives $I_{REF}$ at a node 520 and subtracts $I_{SENSE}$ from node 520 in a manner substantially the same as discussed above with respect to various figures. The capacitor 505, amplifier 510, and comparator 515 function substantially the same as the capacitor 235, amplifier 240, and comparator 245, respectively, as previously described above with reference to FIG. 2 and details for which are not repeated herein.

Figure 6:
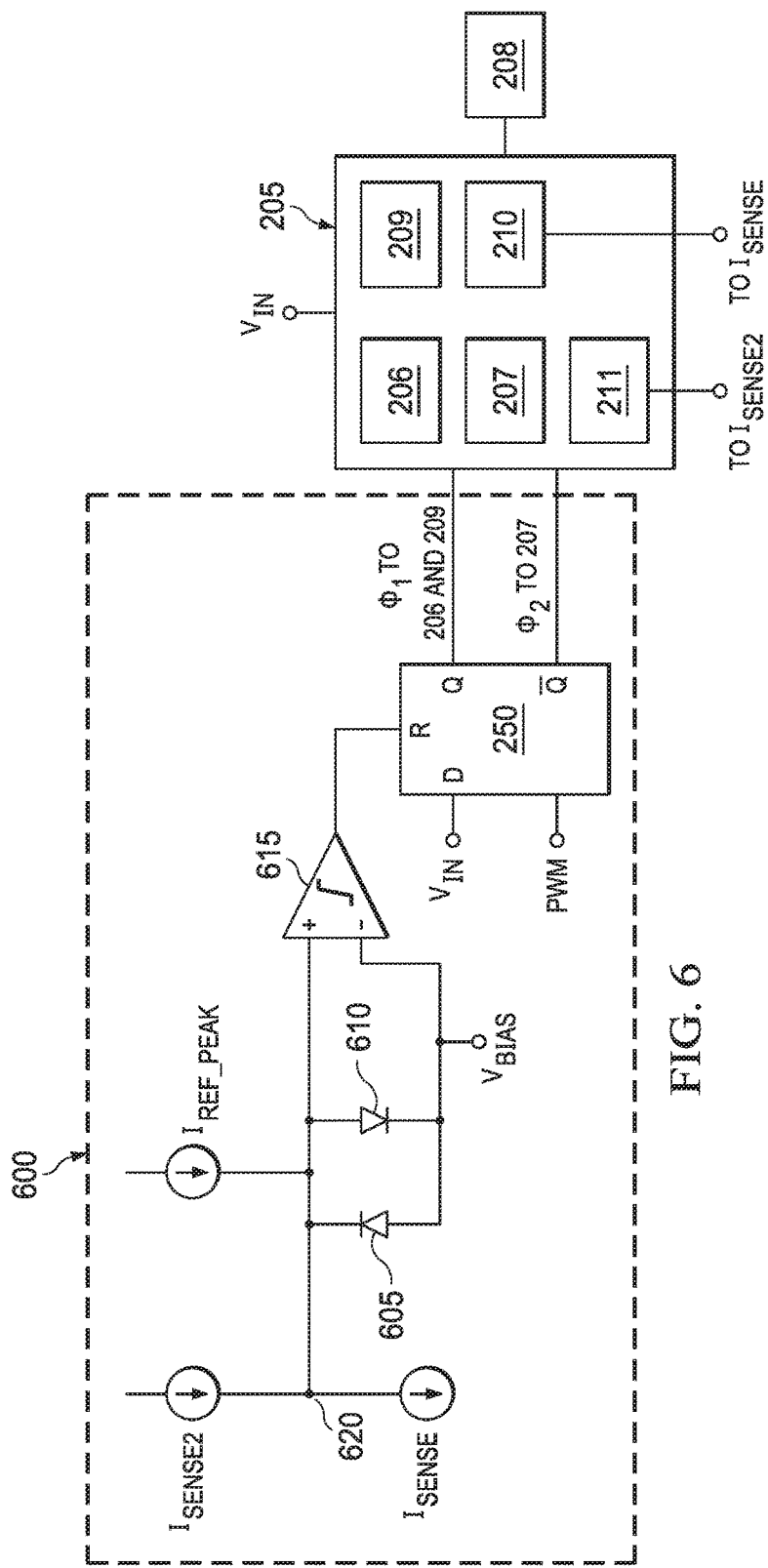
FIG. 6 is a schematic diagram of an illustrative controller.

Referring now to FIG. 6, a schematic diagram of an illustrative controller 600 is shown. In at least some examples, the controller 500 may be referred to as a current limiter or a power converter current limiter. For example, the controller 500 may limit peak input current of the power converter 205 (which may be as discussed above with reference to FIG. 2, details for which are not repeated herein) by monitoring various currents of the power converter 205.

In at least one example, the controller 600 receives $I_{SENSE2}$ at a node 620 and subtracts $I_{SENSE}$ from node 620. In addition, the controller 600 receives $I_{REF\_PEAK}$ at node 520. In at least some examples, $I_{REF\_PEAK}$ indicates a maximum peak current of an inductor (not shown) of the power converter 205. Diodes 605 and 610 are inserted back to back between node 620 and $V_{BIAS}$ to prevent loading or other effects on $V_{BIAS}$ from the controller 600. The comparator 615 compares a value present at node 620 against $I_{REF\_PEAK}$, and when the value present at node 620 exceeds $I_{REF\_PEAK}$, controls the power converter 205 to change from the first phase of operation to the second phase of operation in a manner substantially the same as discussed above with reference to various figures.

Figure 7:
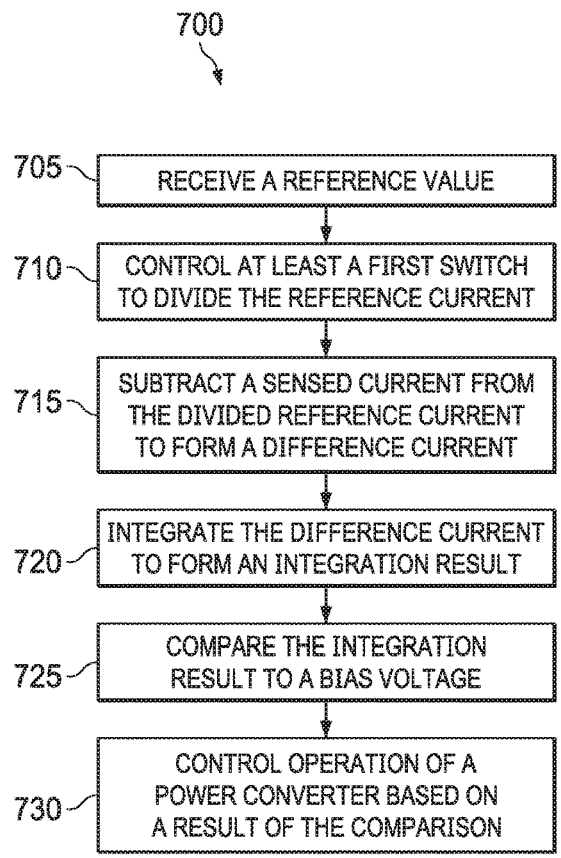
FIG. 7 is a flowchart of an illustrative method of power converter current limiting.

Referring now to FIG. 7, a flowchart of an illustrative method 700 of power converter current limiting is shown. At least some aspects of the method 700 are implemented by any one or more of the controllers of the present disclosure. The method 700 is implemented to, for example, limit an input current (e.g., an average or cycle-to-cycle input current) of a power converter.

At operation 705, the controller receives a reference current. An amount of the reference current is, for example, a maximum desired input current for the power converter. In at least one example, the controller receives the reference current from an outside component. In another example, the controller receives the reference value from an internal reference current generation circuit (e.g., that generates the reference current based on characteristics of the controller, power converter, a power source coupled to the power converter, a load coupled to the power converter, or any other suitable characteristics or criteria).

At operation 710, the controller controls at least a first switch to divide the reference current. For example, the controller may control at least a first switch to selectively couple a resistive element into, or out of, a path of current flow in the controller to divide an amount of current being provided at a given time to a given element. In at least one example, the controller controls the at least first switch based on a phase of operation of the power converter, such as discussed above with respect to the various figures of the present disclosure.

At operation 715, the controller subtracts a sensed current from the divided reference current to form a difference current. The sensed current is, for example, sensed from a single power transistor of the power converter. In at least one example, the sensed current is indicative of an input current of the power converter and is sensed according to any suitable means, a scope of which is not limited herein. In at least one example, the sensed current is subtracted from the divided reference current by sinking the sensed current from a node at which the divided reference current is present.

At operation 720, the controller integrates the difference current to form an integration result. In at least one example, the controller integrates the difference current by providing the difference current to a capacitor and using a voltage of the capacitor as the integration result.

At operation 725, the controller compares the integration result to a bias voltage. The bias voltage is, in some examples, derived from and/or indicative of the reference current. The bias voltage, in at least one example, indicates a maximum value that the integration result may rise to before the power converter has exceeded the maximum desired input current designated by the reference current. In at least one example, the controller compares the integration result to the bias voltage using a comparator that outputs a logical high signal when the integration result meets or exceeds the bias voltage.

At operation 730, the controller controls operation of the power converter based on a result of the comparison. For example, when the integration result exceeds the bias voltage (and correspondingly the comparator outputs a logical high signal), the controller may control the power converter to transition from a first phase of operation to a second phase of operation. The first phase of operation is, for example, a phase in which the power converter draws input current from a power source (e.g., such as a battery) and the second phase of operation is, for example, a phase in which the power converter substantially ceases drawing input current from the power source and may provide current stored in the power converter to a load.

While the operations of the method 700 have been discussed and labeled with numerical reference, the method 700 may include additional operations that are not recited herein, any one or more of the operations recited herein may include one or more sub-operations, any one or more of the operations recited herein may be omitted, and/or any one or more of the operations recited herein may be performed in an order other than that presented herein (e.g., in a reverse order, substantially simultaneously, overlapping, etc.), all of which is intended to fall within the scope of the present disclosure.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. A device that is "configured to" perform a task or function may be configured (e.g., programmed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrase "ground voltage potential" in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A power supply, comprising:
   a controller, comprising:
   a first switch coupled between a first node and a second node;
   a first resistor coupled between the second node and a third node;
   a second resistor coupled between the first node and a fourth node;
   a capacitor coupled between the fourth node and a fifth node;
   an amplifier coupled at a first input to the fourth node, at a second input directly to the third node, and at an output to the fifth node; and
   a comparator coupled at a first input to the fifth node and at a second input directly to the third node.

2. The power supply of claim 1, wherein the controller is configured to receive a reference current at the first node.

3. The power supply of claim 1, wherein the controller is configured to receive a bias voltage at the third node.

4. The power supply of claim 1, wherein the controller is configured to couple to a sense element at the fourth node to subtract a sensed current from the fourth node.

5. The power supply of claim 1, further comprising a latch coupled at a reset input to an output of the comparator, wherein the latch is configured to control a power converter at least partially based on a signal provided at the output of the comparator.

6. The power supply of claim 1, further comprising a power converter.

7. The power supply of claim 1, further comprising a second switch coupled between the first node and the second resistor.

8. The power supply of claim 1, further comprising a second capacitor coupled between the first node and the third node.

9. The power supply of claim 1, wherein the first switch is coupled to a control signal for a first power transistor of a power converter.

10. A controller, configured to:
   receive a reference current at a first node;
   divide the reference current to form a divided reference current by controlling a switch based on a phase of operation of a power converter, wherein the switch is coupled between the first node and a second node, and wherein a first resistor is coupled between the second node and a third node;
   subtract a sensed current from the divided reference current to form a difference current, wherein the sensed current is provided to a current limiter at a fourth node by a sense element, and wherein a second resistor is coupled between the first node and the fourth node;
   integrate the difference current using an integrator, wherein the integrator is coupled at a first input to the fourth node, at a second input to the third node, and at an output to a fifth node; and
   compare the difference current to a bias voltage using a comparator, wherein the comparator is coupled at a first input to the fifth node and at a second input to the third node, and wherein the bias voltage is provided to the current limiter at the third node.

11. The controller of claim 10, wherein the integrator comprises:
   a first capacitor coupled between the fourth node and the fifth node; and
   an amplifier having a first input coupled to the fourth node, a second input coupled to the third node, and an output coupled to the fifth node.

12. The controller of claim 10, wherein a second capacitor is coupled between the first node and the third node.

13. The controller of claim 10, wherein the sensed current is a current flowing through a power transistor of the power converter.

14. The controller of claim 10, further configured to control operation of the power converter based on a result of the comparison.

15. The controller of claim 10, comprising a latch, wherein the latch is configured to control operation of the power converter based at least partially on a result of the comparison.

16. The controller of claim 10, wherein dividing the reference current to form the divided reference current further comprises controlling a second switch based on a second phase of operation of the power converter, wherein the second switch is coupled between the first node the second resistor.

* * * * *